J. W. ADAMS.
Car Coupling.
No. 78,173.
Patented May 26, 1868.
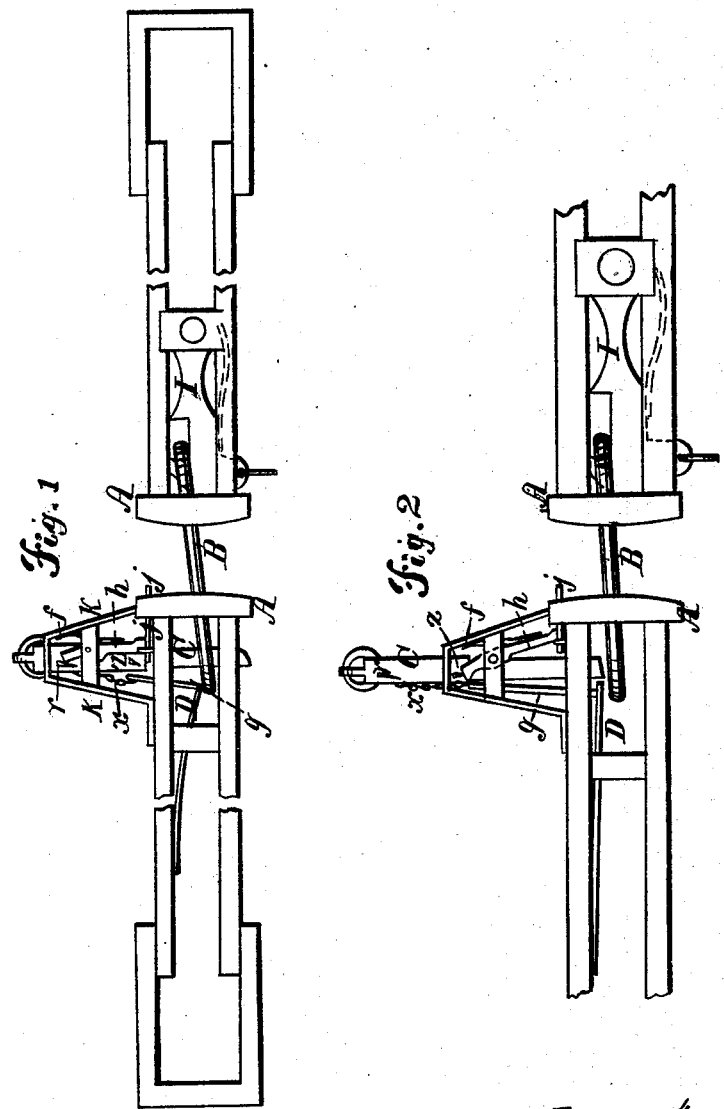
Witnesses;
Wm Van Ebben
John S. Davis
Inventor;
J. W. Adams
per Alexander Mason
attorneys

United States Patent Office.

JOHN W. ADAMS, OF SPRING CREEK, WISCONSIN.

Letters Patent No. 78,173, dated May 26, 1868.

---

IMPROVED CAR-COUPLING.

---

*The Schedule referred to in these Letters Patent and making part of the same.*

---

TO ALL WHOM IT MAY CONCERN:

Be it known that I, JOHN W. ADAMS, of Spring Creek, in the county of Adams, and in the State of Wisconsin, have invented certain new and useful Improvements in "Car-Coupling;" and do hereby declare that the following is a full, clear, and exact description thereof, reference being had to the accompanying drawings, and the letters of reference marked thereon. In the annexed drawings, making a part of this specification—

Figure 1 represents a side elevation of my car-coupling, with the pin down or the link coupled, and Figure 2 represents the same with the pin up and the link uncoupled.

In the annexed drawings, A represents the ordinary draw-head or bumper of a car, and B represents the ordinary link for coupling or attaching cars together.

C represents the coupling-pin, the upper end of which is made square, and so as to work in the case or frame K, which is secured to the top of the draw-head A, and is provided with projections, $r$ and $z$, on one side thereof. The projections $r$ and $z$ are for the purpose of catches or hooks to lock with the upper end of the spring-lever $h$, and thereby hold the pin C up out of the way, when desired.

D represents a spring secured to the top of the chamber in the draw-head, and provided with a rod projecting upward from it, as seen at $g$, and with arms across the front end of it, just so as to work up and down between the sides of the draw-head.

A small chain or cord, $x$, attached to the pin C and rod $g$, connects said pin and spring D together. The spring D operates and serves the double purpose of forcing the pin C down, when desired, and when the projections $r$ or $z$ are detached from the top of the lever $h$, and to hold the link B in a horizontal position, so as to guide it towards and into the mouth of another draw-head.

The lever $h$ is secured or pivoted, as shown, to the side of the case or frame K, and has a rod, $j$, extending from its lower end out horizontally through the front end of the draw-head. A small spring, $f$, is adjusted behind the lever $h$ to keep the same firmly in place.

To use this device the operator raises or draws up the pin C, by means of a suitable ring or loop in the top thereof, and thereby draws the spring D up out of the way, until the projection $z$ catches over the upper end of the lever $h$, as shown in fig. 2 of the drawings, when the link B, and therefore the cars, are uncoupled. The pin C is left in the position above described, until it may be required to couple the car with another, which is run up toward and against it, so that the bumper or draw-head A strikes against the rod $j$, which detaches the lever $h$, and the pin C is forced quickly down through the link B.

I represents a hook which is pivoted in the opposite draw-head. This hook has a rounded front, in the rear of which a piece is cut out, as shown, so as to form a front and rear shoulder. This hook lies on a spring so as to keep it close against the top of the draw-head, and keep the link stationary when secured therein.

What I claim, is—

The arrangement of the lever $h$ and rod $j$, with the pin C and spring D, when constructed as described, and operated by the link D, secured substantially as set forth and for the purposes specified.

In testimony that I claim the foregoing, I have hereunto set my hand, this 20th day of February, 1868.

JOHN W. ADAMS.

Witnesses:
B. DUNBAR,
J. HALL.